(12) United States Patent
Noh et al.

(10) Patent No.: US 9,214,700 B2
(45) Date of Patent: *Dec. 15, 2015

(54) LITHIUM IRON PHOSPHATE CONTAINING SULFUR COMPOUND BASED UPON SULFIDE BOND AND LITHIUM SECONDARY BATTERY USING THE SAME

(71) Applicant: LG CHEM, LTD., Seoul (KR)

(72) Inventors: Hyun Kuk Noh, Daejeon (KR); Hong Kyu Park, Daejeon (KR); Cheol-Hee Park, Daejeon (KR); Su-Min Park, Daejeon (KR); JiEun Lee, Daejeon (KR)

(73) Assignee: LG CHEM, LTD., Seoul (KR)

(*) Notice: Subject to any disclaimer, the term of this patent is extended or adjusted under 35 U.S.C. 154(b) by 36 days.

This patent is subject to a terminal disclaimer.

(21) Appl. No.: 13/647,963

(22) Filed: Oct. 9, 2012

(65) Prior Publication Data

US 2013/0034776 A1 Feb. 7, 2013

Related U.S. Application Data

(63) Continuation of application No. PCT/KR2011/002884, filed on Apr. 21, 2011.

(30) Foreign Application Priority Data

Apr. 21, 2010 (KR) ........................ 10-2010-0037086

(51) Int. Cl.
*H01M 4/02* (2006.01)
*H01M 4/36* (2006.01)
*H01M 4/52* (2010.01)
*H01M 10/0525* (2010.01)
*H01M 4/58* (2010.01)

(52) U.S. Cl.
CPC ........ *H01M 10/0525* (2013.01); *H01M 4/5825* (2013.01); *Y02E 60/122* (2013.01); *Y02T 10/7011* (2013.01)

(58) Field of Classification Search
USPC ................... 429/209–246; 29/623.1–623.5
See application file for complete search history.

(56) References Cited

U.S. PATENT DOCUMENTS

| 2010/0227221 | A1 | 9/2010 | Chang et al. | |
| 2010/0261063 | A1* | 10/2010 | Kitagawa et al. | 429/232 |
| 2011/0091772 | A1* | 4/2011 | Mishima et al. | 429/221 |
| 2011/0274974 | A1* | 11/2011 | Sabi et al. | 429/220 |

FOREIGN PATENT DOCUMENTS

| CA | 101443273 | | 5/2014 | |
| CN | 1785823 | A | 6/2006 | |
| JP | 2009-146773 | A | 4/2001 | |
| JP | 2009-146773 | A | 7/2009 | |
| KR | 10-2007-0091456 | A | 9/2007 | |
| KR | 1020070108664 | | * 10/2007 | |
| KR | 10-2007-0108664 | A | 11/2007 | |
| KR | 10-2008-0083237 | A | 9/2008 | |
| KR | 10-2010-0036627 | A | 4/2010 | |
| WO | WO 2007/094644 | | * 8/2007 | |
| WO | 2009/075289 | A1 | 6/2009 | |
| WO | WO 2009/122686 | | * 10/2009 | 429/221 |

OTHER PUBLICATIONS

Machine Translation of Lee et al. (KR 10-2007-0108664, published Oct. 2007).*
International Search Report issued in PCT/KR2011/002884, mailed on Feb. 6, 2012.

* cited by examiner

*Primary Examiner* — Basia Ridley
*Assistant Examiner* — Caitlin Wilmot
(74) *Attorney, Agent, or Firm* — Birch, Stewart, Kolasch & Birch, LLP

(57) ABSTRACT

Disclosed is lithium iron phosphate having an olivine crystal structure, wherein the lithium iron phosphate has a composition represented by the following Formula 1, a sulfur compound with a sulfide bond is contained, as an impurity, in the lithium iron phosphate particles, and carbon (C) is coated on particle surfaces of the lithium iron phosphate:

$$Li_{1+a}Fe_{1-x}M_x(PO_{4-b})X_b \qquad (1)$$

(wherein M, X, a, x, and b are the same as defined in the specification).

18 Claims, No Drawings

LITHIUM IRON PHOSPHATE CONTAINING SULFUR COMPOUND BASED UPON SULFIDE BOND AND LITHIUM SECONDARY BATTERY USING THE SAME

CROSS REFERENCE TO RELATED APPLICATIONS

This application is a Continuation of PCT International Application No. PCT/KR2011/002884 filed on Apr. 21, 2011, which claims priority under 35 U.S.C. §119(a) to Patent Application No. 10-2010-0037086 filed in the Republic of Korea on Apr. 21, 2010, all of which are hereby expressly incorporated by reference into the present application.

TECHNICAL FIELD

The present invention relates to lithium iron phosphate containing a sulfur compound with a sulfide bond and a lithium secondary battery using the same. More specifically, the present invention relates to lithium iron phosphate that has a predetermined composition and contains a sulfur compound with a sulfide bond, as an impurity, on the lithium iron phosphate particles, wherein carbon (C) is coated on particle surfaces of the lithium iron phosphate, and a lithium secondary battery using the same as an active material.

BACKGROUND ART

Technological development and increased demand for mobile equipment have led to a rapid increase in the demand for secondary batteries as energy sources. Among these secondary batteries, lithium secondary batteries having high energy density and voltage, long lifespan and low self-discharge are commercially available and widely used.

The lithium secondary batteries generally use a carbon material as an anode active material. Also, the use of lithium metals, sulfur compounds, silicon compounds, tin compounds and the like as the anode active material have been considered. Meanwhile, the lithium secondary batteries generally use lithium cobalt composite oxide ($LiCoO_2$) as a cathode active material. Also, the use of lithium-manganese composite oxides such as $LiMnO_2$ having a layered crystal structure and $LiMn_2O_4$ having a spinel crystal structure and lithium nickel composite oxide ($LiNiO_2$) as the cathode active material has been considered.

$LiCoO_2$ is currently used owing to superior physical properties such as cycle life, but has disadvantages of low stability and high-cost due to use of cobalt, which suffers from natural resource limitations, and limitations of mass-use as a power source for electric automobiles. $LiNiO_2$ is unsuitable for practical application to mass-production at a reasonable cost due to many features associated with preparation methods thereof. Lithium manganese oxides such as $LiMnO_2$ and $LiMn_2O_4$ have a disadvantage of short cycle life.

Accordingly, methods of using lithium transition metal phosphate as a cathode active material have been researched. Lithium transition metal phosphate is largely divided into $Li_xM_2(PO_4)_3$ having a Nasicon structure and $LiMPO_4$ having an olivine structure, and is found to exhibit superior high-temperature stability, as compared to conventional $LiCoO_2$. To date, $Li_3V_2(PO_4)_3$ is the most widely known Nasicon structure compound, and $LiFePO_4$ and $Li(Mn, Fe)PO_4$ are the most widely studied olivine structure compounds.

Among olivine structure compounds, $LiFePO_4$ has a high output voltage of 3.5V and a high volume density of 3.6 $g/cm^3$, as compared to lithium (Li), and has a high theoretical capacity of 170 mAh/g, exhibits superior high-temperature stability, as compared to cobalt (Co), and utilizes cheap Fe as an component, thus being highly applicable as the cathode active material for lithium secondary batteries.

However, $LiFePO_4$ disadvantageously causes an increase in internal resistance of batteries due to low electrical conductivity, when used as a cathode active material. For this reason, when battery circuits are closed, polarization potential increases, thus decreasing battery capacity.

In order to solve these problems, Japanese Patent Application Publication No. 2001-110414 suggests incorporation of conductive materials into olivine-type metal phosphates in order to improve conductivity.

However, $LiFePO_4$ is commonly prepared by solid state methods, hydrothermal methods and the like using $Li_2CO_3$ or LiOH as a lithium source. Lithium sources and carbon sources added to improve conductivity disadvantageously generate a great amount of $Li_2CO_3$. Such $Li_2CO_3$ is degraded during charging, or reacts with an electrolyte solution to produce $CO_2$ gas, thus disadvantageously causing production of a great amount of gas during storage or cycles. As a result, disadvantageously, swelling of batteries occurs and high-temperature stability is deteriorated.

In this regard, a method for coating carbon on $LiFePO_4$ is known. However, through repeated experimentation, the inventors of the present invention found that a great amount of carbon should be used in order to obtain desired electrical conductivity using this method. The deterioration in overall physical properties is inevitable during design of batteries and further, a great amount of carbon used for coating are present in the form of aggregates between particles, thus disadvantageously making it difficult to realize uniform coating.

Accordingly, there is an increasing need for methods to solve these problems.

DISCLOSURE

Technical Problem

Therefore, the present invention has been made to solve the above problems and other technical problems that have yet to be resolved.

As a result of a variety of extensive and intensive studies and experiments, the inventors of the present invention have discovered that, when a specific sulfur compound is contained in lithium iron phosphate having an olivine crystal structure, the compound contributes to improvement of physical properties of lithium iron phosphate. Based on this discovery, the present invention has been completed.

Technical Solution

In accordance with one aspect of the present invention, provided is lithium iron phosphate having an olivine crystal structure, wherein the lithium iron phosphate has a composition represented by the following Formula 1, a sulfur compound with a sulfide bond is contained, as an impurity, in the lithium iron phosphate particles, and carbon (C) is coated on particle surfaces of the lithium iron phosphate:

$$Li_{1+a}Fe_{1-x}M_x(PO_{4-b})X_b \qquad (1)$$

wherein

M is at least one selected from Al, Mg, Ni, Co, Mn, Ti, Ga, Cu, V, Nb, Zr, Ce, In, Zn and Y, X is at least one selected from F, S and N, and $-0.5 \le a \le +0.5$, $0 \le x \le 0.5$, $0 \le b \le 0.1$.

Although the olivine-type lithium iron phosphate according to the present invention contains a predetermined amount of sulfur compound as an impurity, the olivine-type lithium iron phosphate has almost no effects on operation performance in the battery fabrication process, but can exhibit high electrical conductivity even using coating of a small amount of carbon based on aid to actions of uniform and hard coating of carbon on the particle surface and prevent separation of electrodes in the manufacturing process thereof due to carbon coating with a strong bonding force, thus contributing to improvement in electrode density.

Any type of compound may be used as an olivine-type lithium iron phosphate according to the present invention so long as it satisfies the conditions of the following formula 1 and a representative example thereof is $LiFePO_4$, but is not limited thereto. It is impossible to obtain only pure $LiFePO_4$ in the preparation process of $LiFePO_4$. Characteristics required for the present invention can be exerted when the conditions of the following formula 1 are satisfied.

As defined above, the lithium iron phosphate according to the present invention contains a sulfur compound as an impurity wherein the sulfur compound has a sulfide bond. The mechanism enabling the compound having a sulfide bond to help actions of lithium iron phosphate is not clearly found.

Examples of sulfur compounds include, but are not limited to, $Li_2S$, $FeS$, $(NH_4)_2S$. These compounds may be contained alone or in combination of two or more types. Preferably, the compound may be $Li_2S$ and/or $FeS$.

Regarding the content of the compound in the lithium iron phosphate particle, the sulfur constituting the sulfur compound is preferably 0.01 to 5% by weight, based on the total weight of the lithium iron phosphate. When the content of the sulfur compound is excessively high, physical properties of lithium iron phosphate may be deteriorated, and on the other hand, when the content is excessively low, improvement of the desired characteristics cannot be obtained. More preferably, the content may be 0.1 to 2% by weight under the conditions.

The sulfur compound may be contained in particles of lithium iron phosphate and, for example, may be derived from a precursor for preparing the lithium iron phosphate.

For example, when $FeSO_4$ is used as a reactive material for preparing lithium iron phosphate, a sulfur compound having a sulfide bond may be formed by reacting sulfur (S) separated from the reactive material with Fe, Li or the like separated from the reactive material or other reactive materials. In some cases, a part of the reactive material may remain unreacted.

In another embodiment, a sulfur precursor may be incorporated in the process of preparing lithium iron phosphate. Examples of such a sulfur precursor include sulfides, sulfites and sulfates.

The particle of the lithium iron phosphate according to the present invention may further contain, in addition to the sulfur compound, iron oxide as an impurity, the iron oxide is, for example, FeO and the content of the iron oxide may be 50% or less, based on the weight of the sulfur compound, as defined above.

Meanwhile, carbon (C) is preferably coated in an amount of 0.01 to 10% by weight, based on the weight of the lithium iron phosphate. When the content of carbon is excessive, the amount of active material becomes relatively low, capacity disadvantageously decreases and electrode density is disadvantageously deteriorated. On the other hand, when the content of carbon is excessively small, disadvantageously, desired electrical conductivity cannot be obtained. The amount of coated carbon is more preferably 0.03 to 7% by weight.

In addition, carbon is preferably uniformly coated on the surface of lithium iron phosphate to a thickness of 2 to 50 nm. When carbon is excessively thickly coated on the surface of lithium iron phosphate, it may interfere with intercalation and deintercalation of lithium ions, and on the other hand, an excessively thin coating cannot secure uniform coating and cannot provide desired electrical conductivity. A more preferred coating thickness may be 3 to 10 nm.

In the present invention, the relationship between sulfur and carbon is not clear, but sulfur and carbon may be present in the form of a structure selected from (i) a structure in which carbon is coated on the surface of lithium iron phosphate particles in a state in which a small amount of sulfur is contained on the surface of lithium iron phosphate particles and/or inside the same, (ii) a structure in which both sulfur and carbon are coated on the surface of lithium iron phosphate particles, (iii) a structure in which carbon is bonded through sulfur to lithium iron phosphate particles, and combinations thereof. It is considered that, through this structure, the sulfur compound helps coating of carbon.

The present invention provides lithium iron phosphate having an olivine crystal structure wherein the lithium iron phosphate has a composition represented by the following Formula 2, a sulfur compound with a sulfide bond is contained, as an impurity, in the lithium iron phosphate particles, and carbon (C) is coated on the particle surface of the lithium iron phosphate containing a predetermined amount of sulfur (S):

$$Li_{(1-a-b)}Fe_{a/2}M'_{b/2}Fe_{1-c}M''_cP_{1-d}X_dO_{4-e}S_e \quad (2)$$

wherein M' is at least one selected from the group consisting of Mg, Ni, Co, Mn, Ti, Cr, Cu, V, Ce, Sn, Ba, Ca, Sr and Zn;

M" is at least one selected from the group consisting of Al, Mg, Ni, Co, Mn, Ti, Cr, Cu, V, Ce, Sn, Ba, Ca, Sr and Zn;

X is at least one selected from the group consisting of As, Sb, Bi, Mo, V, Nb and Te; and $0 \leq a \leq 0.6$, $0 \leq b \leq 0.6$, $0 \leq c \leq 1$, $0 \leq e \leq 3.5$.

Considering the composition of Formula 2, Fe and/or M' is doped into lithium sites and M" is doped into Fe sites, X is doped into P sites X, and a part of sulfur (S) is substituted into oxygen sites.

In the formula above, a and b are each 0.6 or less, but when a+b is 1 or higher, since lithium is not used, a+b should be lower than 1 during charge and discharge. a+b is preferably 0.5, in view of the amount of lithium that is intercalated and deintercalated during charge and discharge and thus exhibits electrochemical properties The present invention provides a method for preparing the olivine-type lithium iron phosphate.

In a preferred embodiment, the olivine-type lithium iron phosphate may be prepared by a method comprising:

(a) primarily mixing precursors as starting materials;

(b) secondarily mixing the mixture of step (a) with supercritical or subcritical water to synthesize lithium iron phosphate;

(c) mixing the synthesized lithium iron phosphate with a carbon precursor and drying the mixture; and (d) heating the mixture of lithium iron phosphate and the carbon precursor.

In step (a), as a lithium precursor, one of the components, $Li_2CO_3$, $Li(OH)$, $Li(OH) \cdot H_2O$, $LiNO_3$ or the like may be used. As an iron (Fe) precursor, a compound containing at least a sulfur ingredient so that sulfur is left on the surface of the produced lithium iron phosphate such as $FeSO_4$, $FeC_2O_4 \cdot 2H_2O$ or $FeCl_2$ may be used. $FeSO_4$ is particularly preferred since it contains a sulfur element. As a phosphorus (P) precursor, $H_3PO_4$, $NH_4H_2PO_4$, $(NH_4)_2HPO_4$ or $P_2O_5$ may be used.

If necessary, an alkalinizing agent may be further added to the components. In this case, the alkalinizing agent may be an alkali metal hydroxide, alkaline earth metal hydroxide, an ammonia compound or the like.

In step (b), the supercritical or subcritical water may be water at a pressure of 180 to 550 bar at 200 to 700 □ and the heating temperature in step (d) may be 600 to 1200 □.

Any carbon precursor may be used so long as it can produce carbon during a baking process under a reduction atmosphere. Preferably, the carbon precursor may be a polyol-type carbon-containing precursor and non-limiting examples thereof include sucrose, cellulose, glucose and the like.

In another embodiment, the olivine-type lithium iron phosphate may be prepared by the following method comprising:

(a') primarily mixing precursors as starting materials;
(b') secondarily mixing the mixture of step (a') with supercritical or subcritical water to synthesize lithium iron phosphate, followed by drying;
(c') heating the synthesized lithium iron phosphate; and
(d') milling the lithium iron phosphate and a carbon powder.

In step (d'), the milling method is well-known in the art and a detailed explanation thereof is thus omitted. In a preferred embodiment, the milling method may be ball milling.

In step (d) or (c'), the heating may be carried out under an inert gas atmosphere. Any inert gas may be used without particular limitation so long as it has low reactivity. Preferred examples thereof include Ar, $N_2$ and the like.

The synthesis of lithium iron phosphate of the present invention is preferably performed through a continuous reaction process.

The lithium iron phosphate according to the present invention may be in the form of a primary particle or a secondary particle. The lithium iron phosphate in the form of a secondary particle may be prepared by drying a mixture of primary particles having a predetermined particle diameter, a binder and a solvent, followed by aggregating.

In the mixture, preferably, the primary particle is present in an amount of 5 to 20 wt % with respect to the weight of the solvent and the binder is present in an amount of 5 to 20 wt % with respect to the weight of the solvent. By controlling a ratio of the primary particle and the solvent, an internal porosity of the secondary particle can be controlled. Examples of solvent that can be used during the process include all organic solvents including polar solvents such as water and non-polar solvents. In addition, examples of the binder used in the step include, but are not limited to, sucrose and lactose-based sugars, PVDF or PE-based polymers and cokes which are soluble in a polar solvent.

The dying and preparation of the secondary particles may be carried out at the same time by various methods known in the art, including spray drying, fluidized-bed drying, vibration drying, etc. In particular, rotating spray drying is preferred, because it enables preparation of secondary particles in the form of spheres and thus improves tap density.

The drying may be carried out at 120 to 200 □ under inert gas (e.g., Ar, $N_2$) atmosphere.

Also, the olivine-type lithium iron phosphate according to the present invention is preferably prepared by a coprecipitation or solid phase method.

In another embodiment, the olivine-type lithium iron phosphate according to the present invention may be prepared by a method comprising:

(a") synthesizing lithium iron phosphate using precursors as starting materials by a coprecipitation or solid phase method;
(b") adding the synthesized lithium iron phosphate to a dispersion chamber containing a sulfur-containing compound, followed by stirring;
(c") drying the mixture obtained in step (b"), followed by baking; and
(d") mixing the lithium iron phosphate obtained in step (c") with a carbon powder, followed by milling, or mixing the calcinized lithium iron phosphate and a carbon precursor with a solvent, followed by drying and baking.

The coprecipitation or solid phase method in step (a") is well-known in the art and a detailed explanation thereof is thus omitted.

The sulfur-containing precursor used for step (b") may be sulfide, sulfite, sulfate or the like, as mentioned above and may be used within a range in which a content suggested in the present invention of sulfur can be contained.

The present invention provides a cathode mix comprising lithium iron phosphate as a cathode active material. The cathode mix may optionally contain, in addition to the cathode active material, a conductive material, a binder, a filler and the like.

The conductive material is commonly added in an amount of 1 to 30% by weight, based on the total weight of the mixture comprising the cathode active material. Any conductive material may be used without particular limitation so long as it has suitable conductivity without causing adverse chemical changes in the battery. Examples of conductive materials include conductive materials, including graphite; carbon blacks such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and polyphenylene derivatives.

The binder is a component which enhances binding of an electrode active material to a conductive material and current collector. The binder is commonly added in an amount of 1 to 30% by weight, based on the total weight of the mixture comprising the cathode active material. Examples of the binder include polyvinylidene, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubbers, fluororubbers and various copolymers.

The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

Meanwhile, the cathode active material may be composed of only the olivine-type lithium iron phosphate and a combination of olivine-type lithium iron phosphate and lithium-containing transition metal oxide, if necessary.

Examples of the lithium transition metal composite oxide include, but are not limited to, layered compounds such as lithium cobalt oxide ($LiCoO_2$) and lithium nickel oxide ($LiNiO_2$), or compounds substituted with one or more transition metals; lithium manganese oxides such as compounds of formula $Li_{1+y}Mn_{2-y}O_4$ ($0 \leq y \leq 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithiated nickel oxides of Formula $LiNi_{1-y}M_yO_2$ (M=Co, Mn, Al, Cu, Fe, Mg, B or Ga, and $0.01 \leq y \leq 0.3$); lithium manganese composite oxides of Formula $LiMn_{2-y}M_yO_2$ (M=Co, Ni, Fe, Cr, Zn or Ta, and $0.01 \leq y \leq 0.1$), or formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$.

The present invention provides a cathode wherein the cathode mix is applied to a collector.

The cathode for secondary batteries may be prepared by applying a slurry obtained by mixing the cathode mix with a solvent such as NMP to a cathode current collector, followed by drying and press-rolling.

The cathode current collector is generally fabricated to have a thickness of 3 to 500 μm. There is no particular limit as to the cathode current collector, so long as it has suitable conductivity without causing adverse chemical changes in the fabricated battery. Examples of the cathode current collector include stainless steel, aluminum, nickel, titanium, sintered carbon, and aluminum or stainless steel which has been surface-treated with carbon, nickel, titanium or silver. If necessary, these current collectors may also be processed to form fine irregularities on the surface thereof so as to enhance adhesive strength to the cathode active materials. In addition, the current collectors may be used in various forms including films, sheets, foils, nets, porous structures, foams and non-woven fabrics.

The present invention provides a lithium secondary battery comprising the cathode, the anode, a separator, and a lithium salt-containing non-aqueous electrolyte.

For example, the anode is prepared by applying an anode mix comprising an anode active material to an anode current collector, followed by drying. The anode mix may comprise the afore-mentioned components, i.e., the conductive material, the binder and the filler, if necessary.

The anode current collector is generally fabricated to have a thickness of 3 to 500 μm. There is no particular limit as to the anode current collector, so long as it has suitable conductivity without causing adverse chemical changes in the fabricated battery. Examples of the anode current collector include copper, stainless steel, aluminum, nickel, titanium, sintered carbon, and copper or stainless steel which has been surface-treated with carbon, nickel, titanium or silver, and aluminum-cadmium alloys. Similar to the cathode current collector, if necessary, these current collectors may also be processed to form fine irregularities on the surface thereof so as to enhance adhesive strength to the anode active materials. In addition, the current collectors may be used in various forms including films, sheets, foils, nets, porous structures, foams and non-woven fabrics.

Examples of the anode active material include carbon and graphite materials such as natural graphite, artificial graphite, expanded graphite, carbon fiber, hard carbon, carbon black, carbon nanotubes, perylene, activated carbon; metals alloyable with lithium, such as Al, Si, Sn, Ag, Bi, Mg, Zn, In, Ge, Pb, Pd, Pt and Ti and compounds containing these elements; composites of carbon and graphite materials with a metal and a compound thereof; and lithium-containing nitrides. Of these, a carbon-based active material, a silicon-based active material, a tin-based active material, or a silicon-carbon-based active material is more preferred. The material may be used alone or in combination of two or more thereof.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and a lithium salt. As the non-aqueous electrolyte, a non-aqueous electrolyte solution, solid electrolyte and inorganic solid electrolyte may be utilized.

Examples of the non-aqueous electrolyte solution that can be used in the present invention include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte utilized in the present invention, include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further contain halogen-containing solvents such as carbon tetrachloride and ethylene trifluoride. Further, in order to improve high-temperature storage characteristics, the non-aqueous electrolyte may further contain carbon dioxide gas or the like and may further contain fluoro-ethylene carbonate (FEC), propene sultone (PRS), fluoro-ethylene carbonate (FEC) and the like.

The lithium secondary batteries according to the present invention may be used as unit batteries of battery modules, which are power sources of medium and large devices requiring high-temperature stability, long cycle properties and high rate properties.

Preferably, examples of medium and large devices include power tools powered by battery-driven motors; electric vehicles including electric vehicles (EVs), hybrid electric vehicles (HEVs) and plug-in hybrid electric vehicles (PHEVs); electric two-wheeled vehicles including electric bikes (E-bikes), electric scooters (E-scooter); electric golf carts and the like.

BEST MODE

Now, the present invention will be described in more detail with reference to the following examples. These examples are provided only to illustrate the present invention and should not be construed as limiting the scope and spirit of the present invention.

Example 1

42.9 g of LiOH—$H_2O$, 32.4 g of ammonia water (~29 wt %), and 924.7 g of distilled water were mixed with one another and dissolved to prepare an aqueous solution A. In the same manner as above, 141.3 g of $FeSO_4$—$7H_2O$, 14.13 g of sucrose, 57.7 g of phosphoric acid (85 wt %), and 786.87 g of distilled water were mixed with one another and dissolved to prepare an aqueous solution B. Supercritical water (450° C., 250 bar) was flowed at an elevated temperature and at an elevated pressure at 100 g/min into a continuous tubular reactor, and the aqueous solution A and the aqueous solution B were flowed at a flow rate of 15 g/min and brought in contact with the supercritical water for several seconds and mixed to induce reaction. At this time, the aqueous solution A first contacted the aqueous solution B to produce a slurry and was then reacted with the supercritical water. The aqueous solution A was reacted with supercritical water as soon as possible after production of slurry.

The $LiFePO_4$ reaction solution thus obtained was cooled and filtered at the end of the tubular reactor to obtain a $LiFePO_4$ slurry. A controlled concentration of water was added to the slurry to obtain a slurry having a solid content of 15 wt %, and 15 wt % of sucrose based on the solid was added thereto, followed by dissolution. The slurry thus obtained was spray-dried to obtain a sucrose-coated $LiFePO_4$ powder.

The powder thus obtained was heated under a nitrogen atmosphere at about 700° C. for 10 hours to obtain a final carbon-coated $LiFePO_4$ powder. As a result of XRD-Rietveld analysis, it could be seen that the powder was a $LiFePO_4$ crystal.

The $LiFePO_4$ powder thus obtained was subjected to C&S analysis to measure contents of carbon and sulfur. As a result, the content of carbon was found to be 2.9 wt % and the content of sulfur was found to be 0.92 wt %.

Example 2

42.9 g of LiOH—$H_2O$, 38.2 g of aqueous ammonia (~29 wt %), and 918.9 g of distilled water were mixed with one another and dissolved to prepare an aqueous solution A. In the same manner as above, 141.3 g of $FeSO_4$—$7H_2O$, 14.13 g of sucrose, 57.7 g of phosphoric acid (85 wt %), and 793.94 g of distilled water were mixed with one another and dissolved to prepare an aqueous solution B. Supercritical water (450° C., 250 bar) was flowed at an elevated temperature and at an elevated pressure at 100 g/min into a continuous tubular reactor, and the aqueous solution A and the aqueous solution B were flowed at a flow rate of 15 g/min and brought in contact with the supercritical water for several seconds and mixed to induce reaction. At this time, the aqueous solution A first contacted the aqueous solution B to produce a slurry and was then reacted with the supercritical water. The aqueous solution A was reacted with supercritical water as soon as possible after production of slurry.

The $LiFePO_4$ reaction solution thus obtained was cooled and filtered at the end of the tubular reactor to obtain a $LiFePO_4$ slurry. A controlled concentration of water was added to the slurry to obtain a slurry having a solid content of 15 wt %, and 9.8 wt % of sucrose based on the solid was added thereto, followed by dissolution. The slurry thus obtained was spray-dried to obtain a sucrose-coated $LiFePO_4$ powder.

The powder thus obtained was heated under a nitrogen atmosphere at about 700° C. for 10 hours to obtain a final carbon-coated $LiFePO_4$ powder. As a result of XRD-Rietveld analysis, it could be seen that the powder was a $LiFePO_4$ crystal.

The $LiFePO_4$ powder thus obtained was subjected to C&S analysis to measure contents of carbon and sulfur. As a result, the content of carbon was found to be 1.54 wt % and the content of sulfur was found to be 0.89 wt %.

Example 3

42.9 g of LiOH—$H_2O$, 44.1 g of aqueous ammonia (~29 wt %), and 918.9 g of distilled water were mixed with one another and dissolved to prepare an aqueous solution A. In the same manner as above, 141.3 g of $FeSO_4$—$7H_2O$, 7.07 g of sucrose, 57.7 g of phosphoric acid (85 wt %), and 793.94 g of distilled water were mixed with one another and dissolved to prepare an aqueous solution B. Supercritical water (450° C., 250 bar) was flowed at an elevated temperature and at an elevated pressure at 100 g/min into a continuous tubular reactor, and the aqueous solution A and the aqueous solution B were flowed at a flow rate of 15 g/min and brought in contact with the supercritical water for several seconds and mixed to induce reaction. At this time, the aqueous solution A first contacted the aqueous solution B to produce a slurry and was then reacted with the supercritical water. The aqueous solution A was reacted with supercritical water as soon as possible after production of slurry.

The $LiFePO_4$ reaction solution thus obtained was cooled and filtered at the end of the tubular reactor, 10-fold weight of distilled water of the resulting slurry was added thereto, followed by washing to obtain a $LiFePO_4$ slurry. A controlled concentration of water was added to the slurry to obtain a slurry having a solid content of 20 wt %, and 12 wt % of sucrose based on the solid was added thereto, followed by dissolution. The slurry thus obtained was spray-dried to obtain a sucrose-coated $LiFePO_4$ powder.

The powder thus obtained was heated under a nitrogen atmosphere at about 700° C. for 10 hours to obtain a final carbon-coated $LiFePO_4$ powder. As a result of XRD-Rietveld analysis, it could be seen that the powder was a $LiFePO_4$ crystal.

The $LiFePO_4$ powder thus obtained was subjected to C&S analysis to measure contents of carbon and sulfur. As a result, the content of carbon was found to be 2.1 wt % and the content of sulfur was found to be 0.53 wt %.

Example 4

42.9 g of LiOH—$H_2O$, 44.1 g of aqueous ammonia (~29 wt %), and 918.9 g of distilled water were mixed with one another and dissolved to prepare an aqueous solution A. In the same manner as above, 141.3 g of $FeSO_4$—$7H_2O$, 7.07 g of sucrose, 57.7 g of phosphoric acid (85 wt %), and 801 g of distilled water were mixed with one another and dissolved to prepare an aqueous solution B. Supercritical water (450° C., 250 bar) was flowed at an elevated temperature and at an elevated pressure at 100 g/min into a continuous tubular reactor, and the aqueous solution A and the aqueous solution B were flowed at a flow rate of 15 g/min and brought in contact with the supercritical water for several seconds and mixed to induce reaction. At this time, the aqueous solution A first contacted the aqueous solution B to produce a slurry and was then reacted with the supercritical water. The aqueous solution A was reacted with supercritical water as soon as possible after production of slurry.

The $LiFePO_4$ reaction solution thus obtained was cooled and filtered at the end of the tubular reactor, and 10-fold weight of distilled water of the resulting slurry was added thereto, followed by washing to obtain a $LiFePO_4$ slurry. A controlled concentration of water was added to the slurry to obtain a slurry having a solid content of 10 wt %, and 7 wt % of sucrose based on the solid was added thereto, followed by dissolution. The slurry thus obtained was spray-dried to obtain a sucrose-coated $LiFePO_4$ powder.

The powder thus obtained was heated under a nitrogen atmosphere at about 700° C. for 10 hours to obtain a final carbon-coated $LiFePO_4$ powder. As a result of XRD-Rietveld analysis, it could be seen that the powder was a $LiFePO_4$ crystal.

The $LiFePO_4$ powder thus obtained was subjected to C&S analysis to measure contents of carbon and sulfur. As a result, the content of carbon was found to be 1.3 wt % and the content of sulfur was found to be 0.42 wt %.

Example 5

52.9 g of $LiOH$—$H_2O$, 32.4 g of aqueous ammonia (~29 wt %), and 914.7 g of distilled water were mixed with one another and dissolved to prepare an aqueous solution A. In the same manner as above, 141.3 g of $FeSO_4$—$7H_2O$, 14.13 g of sucrose, 57.7 g of phosphoric acid (85 wt %), and 786.87 g of distilled water were mixed with one another and dissolved to prepare an aqueous solution B. Supercritical water (490° C., 280 bar) was flowed at an elevated temperature and at an elevated pressure at 100 g/min into a continuous tubular reactor, and the aqueous solution A and the aqueous solution B were flowed at a flow rate of 15 g/min and brought in contact with the supercritical water for several seconds and mixed to induce reaction. At this time, the aqueous solution A first contacted the aqueous solution B to produce a slurry and was then reacted with the supercritical water. The aqueous solution A was reacted with supercritical water as soon as possible after production of slurry.

The $LiFePO_4$ reaction solution thus obtained was cooled and filtered at the end of the tubular reactor to obtain a $LiFePO_4$ slurry. A controlled concentration of water was added to the slurry to obtain a slurry having a solid content of 15 wt %, and 15 wt % of sucrose based on the solid was added thereto, followed by dissolution. The slurry thus obtained was spray-dried to obtain a sucrose-coated $LiFePO_4$ powder.

The powder thus obtained was heated under a nitrogen atmosphere at about 650° C. for 10 hours to obtain a final carbon-coated $LiFePO_4$ powder. As a result of XRD-Rietveld analysis, it could be seen that the powder was a $LiFePO_4$ crystal.

The $LiFePO_4$ powder thus obtained was subjected to C&S analysis to measure contents of carbon and sulfur. As a result, the content of carbon was found to be 2.9 wt % and the content of sulfur was found to be 0.72 wt %.

Example 6

40.9 g of $LiOH$—$H_2O$, 38.2 g of aqueous ammonia (~29 wt %), and 915.9 g of distilled water were mixed with one another and dissolved to prepare an aqueous solution A. In the same manner as above, 141.3 g of $FeSO_4$—$7H_2O$, 14.13 g of glucose, 57.7 g of phosphoric acid (85 wt %), and 793.94 g of distilled water were mixed with one another and dissolved to prepare an aqueous solution B. Supercritical water (450° C., 230 bar) was flowed at an elevated temperature and at an elevated pressure at 80 g/min into a continuous tubular reactor, and the aqueous solution A and the aqueous solution B were flowed at a flow rate of 10 g/min and brought in contact with the supercritical water for several seconds and mixed to induce reaction. At this time, the aqueous solution A first contacted the aqueous solution B to produce a slurry and was then reacted with the supercritical water. The aqueous solution A was reacted with supercritical water as soon as possible after production of slurry.

The $LiFePO_4$ reaction solution thus obtained was cooled and filtered at the end of the tubular reactor to obtain a $LiFePO_4$ slurry. A controlled concentration of water was added to the slurry to obtain a slurry having a solid content of 12 wt %, and 8 wt % of sucrose based on the solid was added thereto, followed by dissolution. The slurry thus obtained was spray-dried to obtain a sucrose-coated $LiFePO_4$ powder.

The powder thus obtained was heated under a nitrogen atmosphere at about 700° C. for 6 hours to obtain a final carbon-coated $LiFePO_4$ powder. As a result of XRD-Rietveld analysis, it could be seen that the powder was a $LiFePO_4$ crystal.

The $LiFePO_4$ powder thus obtained was subjected to C&S analysis to measure contents of carbon and sulfur. As a result, the content of carbon was found to be 1.54 wt % and the content of sulfur was found to be 0.50 wt %.

Example 7

42.1 g of $LiOH$—$H_2O$, 44.1 g of aqueous ammonia (~29 wt %), and 918.9 g of distilled water were mixed with one another and dissolved to prepare an aqueous solution A. In the same manner as above, 141.3 g of $FeSO_4$—$7H_2O$, 7.07 g of ascorbic acid, 59.6 g of phosphoric acid (85 wt %), and 792.2 g of distilled water were mixed with one another and dissolved to prepare an aqueous solution B. Supercritical water (440° C., 255 bar) was flowed at an elevated temperature and at an elevated pressure at 100 g/min into a continuous tubular reactor, and the aqueous solution A and the aqueous solution B were flowed at a flow rate of 15 g/min and brought in contact with the supercritical water for several seconds and mixed to induce reaction. At this time, the aqueous solution A first contacted the aqueous solution B to produce a slurry and was then reacted with the supercritical water. The aqueous solution A was reacted with supercritical water as soon as possible after production of slurry.

The $LiFePO_4$ reaction solution thus obtained was cooled and filtered at the end of the tubular reactor, 10-fold weight of distilled water of the resulting slurry was added thereto, followed by washing to obtain a $LiFePO_4$ slurry. A controlled concentration of water was added to the slurry to obtain a slurry having a solid content of 20 wt %, and 10 wt % of sucrose based on the solid was added thereto, followed by dissolution. The slurry thus obtained was spray-dried to obtain a sucrose-coated $LiFePO_4$ powder.

The powder thus obtained was heated under a nitrogen atmosphere at about 650° C. for 10 hours to obtain a final carbon-coated $LiFePO_4$ powder. As a result of XRD-Rietveld analysis, it could be seen that the powder was a $LiFePO_4$ crystal.

The $LiFePO_4$ powder thus obtained was subjected to C&S analysis to measure contents of carbon and sulfur. As a result, the content of carbon was found to be 2.1 wt % and the content of sulfur was found to be 0.33 wt %.

Example 8

42.9 g of $LiOH$—$H_2O$, 44.1 g of aqueous ammonia (~29 wt %), and 918.9 g of distilled water were mixed with one another and dissolved to prepare an aqueous solution A. In the same manner as above, 141.3 g of $FeSO_4$—$7H_2O$, 7.07 g of hydroxyethyl cellulose, 57.7 g of phosphoric acid (85 wt %), and 801 g of distilled water were mixed with one another and dissolved to prepare an aqueous solution B. Supercritical water (450° C., 300 bar) was flowed at an elevated temperature and at an elevated pressure at 80 g/min into a continuous tubular reactor, and the aqueous solution A and the aqueous solution B were flowed at a flow rate of 12 g/min and brought in contact with the supercritical water for several seconds and mixed to induce reaction. At this time, the aqueous solution A first contacted the aqueous solution B to produce a slurry and was then reacted with the supercritical water. The aqueous solution A was reacted with supercritical water as soon as possible after production of slurry.

The $LiFePO_4$ reaction solution thus obtained was cooled and filtered at the end of the tubular reactor, 10-fold weight of distilled water of the resulting slurry was added thereto, followed by washing to obtain a $LiFePO_4$ slurry. A controlled concentration of water was added to the slurry to obtain a slurry having a solid content of 10 wt %, and 7 wt % of sucrose based on the solid was added thereto, followed by dissolution. The slurry thus obtained was spray-dried to obtain a sucrose-coated $LiFePO_4$ powder.

The powder thus obtained was heated under a nitrogen atmosphere at about 800° C. for 10 hours to obtain a final carbon-coated $LiFePO_4$ powder. As a result of XRD-Rietveld analysis, it could be seen that the powder was a $LiFePO_4$ crystal.

The $LiFePO_4$ powder thus obtained was subjected to C&S analysis to measure contents of carbon and sulfur. As a result, the content of carbon was found to be 1.3 wt % and the content of sulfur was found to be 0.32 wt %.

Example 9

40.2 g of LiOH—$H_2O$, 37.4 g of aqueous ammonia (~29 wt %), and 911 g of distilled water were mixed with one another and dissolved to prepare an aqueous solution A. In the same manner as above, 152.3 g of $FeSO_4$—$7H_2O$, 15.1 g of sucrose, 59.7 g of phosphoric acid (85 wt %), and 782 g of distilled water were mixed with one another and dissolved to prepare an aqueous solution B. Supercritical water (430° C., 250 bar) was flowed at an elevated temperature and at an elevated pressure at 100 g/min into a continuous tubular reactor, and the aqueous solution A and the aqueous solution B were flowed at a flow rate of 15 g/min and brought in contact with the supercritical water for several seconds and mixed to induce reaction. At this time, the aqueous solution A first contacted the aqueous solution B to produce a slurry and was then reacted with the supercritical water. The aqueous solution A was reacted with supercritical water as soon as possible after production of slurry to prepare $Li_{0.90}Fe_{0.05}FePO_4$.

The $Li_{0.90}Fe_{0.05}FePO_4$ reaction solution thus obtained was cooled and filtered at the end of the tubular reactor to obtain a $Li_{0.90}Fe_{0.05}FePO_4$ slurry. A controlled concentration of water was added to the slurry to obtain a slurry having a solid content of 20 wt %, and 6 wt % of sucrose based on the solid was added thereto, followed by dissolution. The slurry thus obtained was spray-dried to obtain a sucrose-coated $Li_{0.90}Fe_{0.05}FePO_4$ powder.

The powder thus obtained was heated under a nitrogen atmosphere at about 700° C. for 10 hours to obtain a final carbon-coated $Li_{0.90}Fe_{0.05}FePO_4$ powder.

The $Li_{0.90}Fe_{0.05}FePO_4$ powder thus obtained was subjected to C&S analysis to measure contents of carbon and sulfur. As a result, the content of carbon was found to be 1.02 wt % and the content of sulfur was found to be 0.46 wt %.

Example 10

41 g of LiOH—$H_2O$, 33.4 g of aqueous ammonia (~29 wt %), and 920.2 g of distilled water were mixed with one another and dissolved to prepare an aqueous solution A. In the same manner as above, 117.3 g of $FeSO_4$—$7H_2O$, 13.3 g of sucrose, 55.7 g of phosphoric acid (85 wt %), 3.9 g of $CuCl_2$—$2H_2O$ and 796.87 g of distilled water were mixed with one another and dissolved to prepare an aqueous solution B. Supercritical water (450° C., 280 bar) was flowed at an elevated temperature and at an elevated pressure at 100 g/min into a continuous tubular reactor, and the aqueous solution A and the aqueous solution B were flowed at a flow rate of 15 g/min and brought in contact with the supercritical water for several seconds and mixed to induce reaction. At this time, the aqueous solution A first contacted the aqueous solution B to produce a slurry and was then reacted with the supercritical water. The aqueous solution A was reacted with supercritical water as soon as possible after production of slurry to prepare $LiFe_{0.88}Cu_{0.12}PO_4$.

The $LiFe_{0.88}Cu_{0.12}PO_4$ reaction solution thus obtained was cooled and filtered at the end of the tubular reactor to obtain a $LiFe_{0.88}Cu_{0.12}PO_4$ slurry. A controlled concentration of water was added to the slurry to obtain a slurry having a solid content of 15 wt %, and 10 wt % of sucrose based on the solid was added thereto, followed by dissolution. The slurry thus obtained was spray-dried to obtain a sucrose-coated $LiFe_{0.88}Cu_{0.12}PO_4$ powder.

The powder thus obtained was heated under a nitrogen atmosphere at about 750° C. for 10 hours to obtain a final carbon-coated $LiFe_{0.88}Cu_{0.12}PO_4$ powder.

The $LiFe_{0.88}Cu_{0.12}PO_4$ powder thus obtained was subjected to C&S analysis to measure contents of carbon and sulfur. As a result, the content of carbon was found to be 2.1 wt % and the content of sulfur was found to be 0.7 wt %.

Example 11

38.2 g of LiOH—$H_2O$, 36.2 g of aqueous ammonia (~29 wt %), and 934.7 g of distilled water were mixed with one another and dissolved to prepare an aqueous solution A. In the same manner as above, 122.3 g of $FeSO_4$—$7H_2O$, 13.3 g of sucrose, 55.7 g of phosphoric acid (85 wt %), 6 g of $CoSO_4$—$7H_2O$, and 792.7 g of distilled water were mixed with one another and dissolved to prepare an aqueous solution B. Supercritical water (420° C., 240 bar) was flowed at an elevated temperature and at an elevated pressure at 100 g/min into a continuous tubular reactor, and the aqueous solution A and the aqueous solution B were flowed at a flow rate of 15 g/min and brought in contact with the supercritical water for several seconds and mixed to induce reaction. At this time, the aqueous solution A first contacted the aqueous solution B to produce a slurry and was then reacted with the supercritical water. The aqueous solution A was reacted with supercritical water as soon as possible after production of slurry to prepare $Li_{0.8}Co_{0.1}Fe_{0.91}Co_{0.09}PO_4$.

The $Li_{0.8}Co_{0.1}Fe_{0.91}Co_{0.09}PO_4$ reaction solution thus obtained was cooled and filtered at the end of the tubular reactor to obtain a $Li_{0.8}Co_{0.1}Fe_{0.91}Co_{0.09}PO_4$ slurry. A controlled concentration of water was added to the slurry to obtain a slurry having a solid content of 20 wt %, and 15 wt % of sucrose based on the solid was added thereto, followed by dissolution. The slurry thus obtained was spray-dried to obtain a sucrose-coated $Li_{0.8}Co_{0.1}Fe_{0.91}Co_{0.09}PO_4$ powder.

The powder thus obtained was heated under a nitrogen atmosphere at about 700° C. for 6 hours to obtain a final carbon-coated $Li_{0.8}Co_{0.1}Fe_{0.91}Co_{0.09}PO_4$ powder.

The $Li_{0.8}Co_{0.1}Fe_{0.91}Co_{0.09}PO_4$ powder thus obtained was subjected to C&S analysis to measure contents of carbon and sulfur. As a result, the content of carbon was found to be 3.1 wt % and the content of sulfur was found to be 1.3 wt %.

Comparative Example 1

$LiOH$—$H_2O$, $Fe(C_2O_4)$—$2H_2O$, and $H_3PO_4$ were placed as raw materials at a molar ratio of 3:1:1 in an autoclave batch reactor, and the materials were reacted with one another at an elevated internal temperature of the reactor of 250° C. for about 10 hours to synthesize $LiFePO_4$.

Sucrose was added to the slurry containing $LiFePO_4$ thus obtained in the same manner as Example 1, followed by spray-drying and baking under a nitrogen atmosphere to obtain a $LiFePO_4$ powder as a final product.

The $LiFePO_4$ powder thus obtained was subjected to C&S analysis to measure contents of carbon and sulfur. As a result, the content of carbon was found to be 2.5 wt % and the content of sulfur was found to be 0.01 wt %.

Test Example 1

Coin cells including cathodes, Li metal anodes and separators using $LiFePO_4$ powders prepared in Examples 1 to 11 and Comparative Examples 1 and 2 as cathode active materials were produced. The coin cells thus produced were subjected to rate-limiting property test (2 C/0.1 C, %). The results are shown in the following Table 1.

TABLE 1

| | Rate-limiting property (2C/0.1C, %) |
|---|---|
| Ex. 1 | 92 |
| Ex. 2 | 93 |
| Ex. 3 | 93 |
| Ex. 4 | 91 |
| Ex. 5 | 94 |
| Ex. 6 | 92 |
| Ex. 7 | 91 |
| Ex. 8 | 92 |
| Ex. 9 | 91 |
| Ex. 10 | 90 |
| Ex. 11 | 91 |
| Comp. Ex. 1 | 88 |

As can be seen from Table 1 above, lithium iron phosphate powders of Examples 2 to 4, and 6 to 10 exhibited superior electrochemical properties in spite of small amount of carbon, as compared to the $LiFePO_4$ powder of Comparative Example 1.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the afore-going, although the olivine-type lithium iron phosphate according to the present invention contains a predetermined amount of sulfur compound as an impurity, the olivine-type lithium iron phosphate has almost no effects on operation performance in the battery fabrication process, but can advantageously exhibit high electrical conductivity even using coating of a small amount of carbon based on aid to actions of uniform and hard coating of carbon on the particle surface and prevent separation of electrodes in the manufacturing process thereof due to carbon coating with a strong bonding force, thus contributing to improvement in electrode density.

The invention claimed is:

1. Lithium iron phosphate having an olivine crystal structure, wherein the lithium iron phosphate has a composition represented by the following Formula 1, a sulfur compound with a sulfide bond is contained, as an impurity, in the lithium iron phosphate particles, and carbon (C) is coated on particle surfaces of the lithium iron phosphate, wherein the carbon (C) is coated at an amount of 0.01 to 10% by weight, based on the total weight of the lithium iron phosphate, and wherein the lithium iron phosphate is prepared by a supercritical hydrothermal method, wherein the sulfur (S) constituting the sulfur compound is contained at in an amount of about 0.1 to 5% by weight, based on the total weight of the lithium iron phosphate $$Li_{1+a}Fe_{1-x}M_x(PO_{4-b})X_b \qquad (1)$$

wherein

M is at least one selected from Al, Mg, Ni, Co, Mn, Ti, Ga, Cu, V, Nb, Zr, Ce, in, Zn and Y, X is at least one selected from F, S and N, and −0.5≤a≤+0.5, 0≤x≤0.5, 0≤b≤0.1.

2. The lithium iron phosphate according to claim 1, wherein the lithium iron phosphate is $LiFePO_4$.

3. The lithium iron phosphate according to claim 1, wherein the sulfur compound is at least one selected from the group consisting of $Li_2S$, FeS, and $(NH_4)_2S$.

4. The lithium iron phosphate according to claim 1, wherein the sulfur compound is derived from a precursor for preparation of the lithium iron phosphate.

5. The lithium iron phosphate according to claim 1, wherein the lithium iron phosphate particle further comprises iron oxide as an impurity.

6. The lithium iron phosphate according to claim 1, wherein the carbon is coated on the particle surface of lithium iron phosphate to a thickness of 2 to 50 nm.

7. Lithium iron phosphate having an olivine crystal structure wherein the lithium iron phosphate has a composition represented by the following Formula 2, a sulfur compound with a sulfide bond is contained, as an impurity, in the lithium iron phosphate particles, and carbon (C) is coated on the particle surface of the lithium iron phosphate containing a predetermined amount of sulfur (S) and wherein the carbon (C) is coated at an amount of 0.01 to 10% by weight, based on the total weight of the lithium iron phosphate, and $$Li_{(1-a-b)}Fe_{a/2}M'_{b/2}Fe_{1-c}M''_cPO_{4-e}S_e \qquad (2)$$

wherein M' is at least one selected from the group consisting of Mg, Ni, Co, Mn, Ti, Cr, Cu, V, Ce, Sn, Ba, Ca, Sr and Zn;

M" is at least one selected from the group consisting of Al, Mg, Ni, Co, Mn, Ti, Cr, Cu, V, Ce, Sn, Ba, Ca, Sr and Zn; and 0≤a≤0.6, 0≤b≤0.6, 0≤c≤1, 0≤e≤3.5.

8. A method for preparing the lithium iron phosphate according to claim 1 comprising:

(a) primarily mixing precursors as starting materials;

(b) secondarily mixing the mixture obtained in step (a) with supercritical or subcritical water to synthesize lithium iron phosphate;

(c) mixing the synthesized lithium iron phosphate with a carbon precursor and (drying the mixture; and
(d) heating the mixture of the lithium iron phosphate and the carbon precursor.

9. A method for preparing the lithium iron phosphate according to claim 1 comprising:
(a') primarily mixing precursors as starting materials;
(b') secondarily mixing the mixture obtained in step (a') with supercritical or subcritical water to synthesize lithium, iron phosphate, followed by drying;
(c') heating the synthesized lithium iron phosphate; and
(d') milling the lithium iron phosphate and a carbon powder.

10. The method according to claim 8, wherein the heating is carried out under an inert as atmosphere.

11. The method according to claim 8, wherein the synthesis of the lithium iron phosphate is carried out by a continuous reaction process.

12. A cathode mix comprising the lithium iron phosphate according to claim 1 as a cathode active material.

13. A lithium secondary battery comprising a cathode in which the cathode mix according to claim 12 is applied to a current collector.

14. The lithium secondary battery according to claim 13, wherein the lithium secondary battery is a unit battery of a battery module that is a power source of a medium to large device.

15. The lithium secondary battery according to claim 14, wherein the medium to large device is a power tool, an electric vehicle, a hybrid electric vehicle, or an electric golf cart.

16. A cathode mix comprising the lithium iron phosphate according to claim 7 as a cathode active material.

17. The method according to claim 9, wherein the heating is carried out under an inert gas atmosphere.

18. The lithium iron phosphate according to claim 7, wherein the lithium iron phosphate is prepared by a supercritical hydrothermal method.

* * * * *